United States Patent
Shimizu et al.

(10) Patent No.: US 7,481,568 B2
(45) Date of Patent: Jan. 27, 2009

(54) SURFACE LIGHT SOURCE DEVICE, FLAT TYPE DISPLAY DEVICE AND LIQUID CRYSTAL DISPLAY DEVICE

(75) Inventors: Makoto Shimizu, Kanazawa (JP); Yoshinori Yasuda, Ishikawa (JP); Toshihiko Ura, Nomi (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 69 days.

(21) Appl. No.: 11/636,992

(22) Filed: Dec. 12, 2006

(65) Prior Publication Data

US 2007/0147068 A1 Jun. 28, 2007

(30) Foreign Application Priority Data

Dec. 28, 2005 (JP) ............................. 2005-378562

(51) Int. Cl.
*F21V 7/04* (2006.01)
(52) U.S. Cl. ..................... 362/632; 362/611; 362/613; 362/614; 362/633; 362/634
(58) Field of Classification Search ......... 362/632–634, 362/608, 611, 613, 614, 220, 225, 647
See application file for complete search history.

(56) References Cited

U.S. PATENT DOCUMENTS

| 5,537,296 | A | * | 7/1996 | Kimura et al. | ............... 362/634 |
| 5,654,779 | A | * | 8/1997 | Nakayama et al. | ............ 349/58 |
| 2004/0218111 | A1 | * | 11/2004 | Mochizuki | ................... 349/44 |
| 2005/0122740 | A1 | * | 6/2005 | Cha et al. | ..................... 362/608 |
| 2005/0162867 | A1 | * | 7/2005 | Sinofsky | ...................... 362/615 |
| 2006/0018131 | A1 | * | 1/2006 | Kim | ........................... 362/634 |
| 2007/0053177 | A1 | * | 3/2007 | Choi et al. | .................... 362/97 |

FOREIGN PATENT DOCUMENTS

JP 2003-66448 3/2003

* cited by examiner

*Primary Examiner*—Ali Alavi
*Assistant Examiner*—Evan Dzierzynski
(74) *Attorney, Agent, or Firm*—Finnegan, Henderson, Farabow, Garrett & Dunner, L.L.P.

(57) ABSTRACT

An uneven surface portion is formed on the inner surface of a lamp holder to thereby reduce the contact area between the inner surface of the lamp holder and a light incident face of a light guide plate. The light incident face of the light guide plate and the inner surface of the lamp holder are prevented from coming into close contact with each other due to heat transferring from cold-cathode fluorescent tubes and to the light guide plate. The heat transferring via the lamp holder to the light guide plate is intercepted by an air layer occurring between the uneven surface portion of the lamp holder and the light incident face of the light guide plate. Accordingly, it can be prevented that a part of the lamp holder sticks to the light incident face of the light guide plate of the backlight when the lamp holder is replaced.

8 Claims, 4 Drawing Sheets

SURFACE LIGHT SOURCE DEVICE, FLAT TYPE DISPLAY DEVICE AND LIQUID CRYSTAL DISPLAY DEVICE

INCORPORATION BY REFERENCE

The present application claims priority under 35 U.S.C. §119 to Japanese Patent Application No. 2005-378562 filed on Dec. 28, 2005. The content of the application is incorporated herein by reference in its entirety.

FIELD OF THE INVENTION

The present invention relates to a surface light source device having a light guide body guiding light incident from a light source to one principal surface in a planar form, a flat type display device and a liquid crystal display device.

BACKGROUND OF THE INVENTION

An illumination unit as this type of surface light source device has been hitherto used as a display device for information equipment such as a laptop type or notebook-size type word processor, computer or the like because of its features such as lightness in weight, thin design and low power consumption. In particular, this illumination unit is attached to a transmissive type liquid crystal panel while stacked on the liquid crystal panel, so that an image displayed on the liquid crystal panel can be visible.

Furthermore, in connection with the recent propagation of liquid crystal display devices in the amusement industry, it has been demanded that the screen size of a liquid crystal panel used as this type of liquid crystal display device is increased, the brightness of the liquid crystal panel is further enhanced, and the lifetime of the liquid crystal panel is increased.

The illumination unit for illuminating light from the backside to the liquid crystal panel used for this type of liquid crystal display device is equipped with a slender lamp unit as disclosed in, for example, Japanese Laid-Open Patent Publication No. 2003-66448. In this lamp unit, rubber lamp holders for supporting a tubular light source are attached to both end portions of the light source. Furthermore, a reflection sheet for reflecting light from the light source of the lamp unit to the liquid crystal panel side is attached to the lamp unit.

Furthermore, a light guide plate through which light from the light source of the lamp unit is efficiently transmitted to the liquid crystal panel is attached to the lamp unit while one end portion of the light guide plate faces the light source and one end face thereof is brought into contact with one side surface of the lamp holder. The lamp unit is designed so that it can be detached from the illumination unit by pulling out the lamp unit from the illumination unit in the longitudinal direction to be replaced with a new one.

However, in the liquid crystal display device described above, the lamp holder attached to the one side surface of the lamp holder is brought into contact with one end face of the light guide plate. Accordingly, when the lamp unit is used for a long period of time, the light guide plate is deformed by heat from the light source of the lamp unit, and one side surface of the lamp holder sticks to the light guide plate. This sticking cannot be eliminated even when the light source is turned off to cool the lamp unit. Accordingly, there is a risk that a part of the lamp holder is damaged and thus remains in the illumination unit every time the lamp unit is replaced with a new one. Therefore, there is a problem that it is difficult to replace the lamp unit.

The present invention has been implemented in view of the foregoing problem, and has an object to provide a surface light source device, a flat type display device and a liquid crystal display device in which a light source can be easily replaced with a new one.

SUMMARY OF THE INVENTION

The present invention is equipped with a tubular light source, a holder that is attached to at least one end portion of the light source and has at least one side surface, and a flat plate type light guide body that has one end portion brought into contact with one side surface of the holder and guides light incident from the one end portion to one principal surface in a planar form, the light source and the holder being detachably attached in a state that the one end portion of the light guide body faces the light source, wherein the holder has a shape of the one side surface of the holder designed as an uneven surface so that the contact area between the one side surface of the holder and the one end portion of the light guide body is reduced, and the light source and the holder are detachable from the light guide body, and the uneven surface is provided with a plurality of projecting portions arranged in a direction crossing the detaching direction of the light source and the holder with respect to the light guide body, and large-diameter projecting portions provided at both the sides of the uneven surface so as to sandwich the plurality of projecting portions therebetween, the lateral dimension of the large-diameter projecting portions being larger than that of the projecting portions.

Furthermore, the present invention is equipped with a tubular light source, a holder that is attached to at least one end portion of the light source and has at least one side surface, and a flat plate type light guide body that has one end portion brought into contact with one side surface of the holder and guides light incident from the one end portion to one principal surface in a planar form, the light source and the holder being detachably attached in a state that the one end portion of the light guide body faces the light source, wherein the holder has a shape of the one side surface of the holder designed as an uneven surface so that the contact area between the one side surface of the holder and the one end portion of the light guide body is reduced, the uneven surface has groove portions each having a U-shaped cross-section, the light source and the holder are moved along the longitudinal direction of the light source so as to be detachable from the light guide body, and the groove portions are provided continuously across both end portions of the holder along the longitudinal direction of the light source.

According to the present invention, since the shape of the one side surface of the holder is made so that the contact area between the one side surface of the holder and the one end portion of the light guide body is reduced, even when the holder is attached while the one side surface of the holder is brought into contact with the one end portion of the light guide body, the one side surface of the holder can be prevented from sticking to the one end portion of the light guide body by the heat from the light source. Accordingly, there is no risk that a part of the holder sticks to one end portion of the light guide body and thus remains there, and the holder can be easily removed from the light guide body together with the light source. Therefore, the light source can be easily replaced with a new one.

DETAILED DESCRIPTION OF THE PREFERRED EMBODIMENT

The construction of a first embodiment of a surface light source device according to the present invention will be described hereunder with reference to FIG. 1 to FIG. 3.

Figure 1:
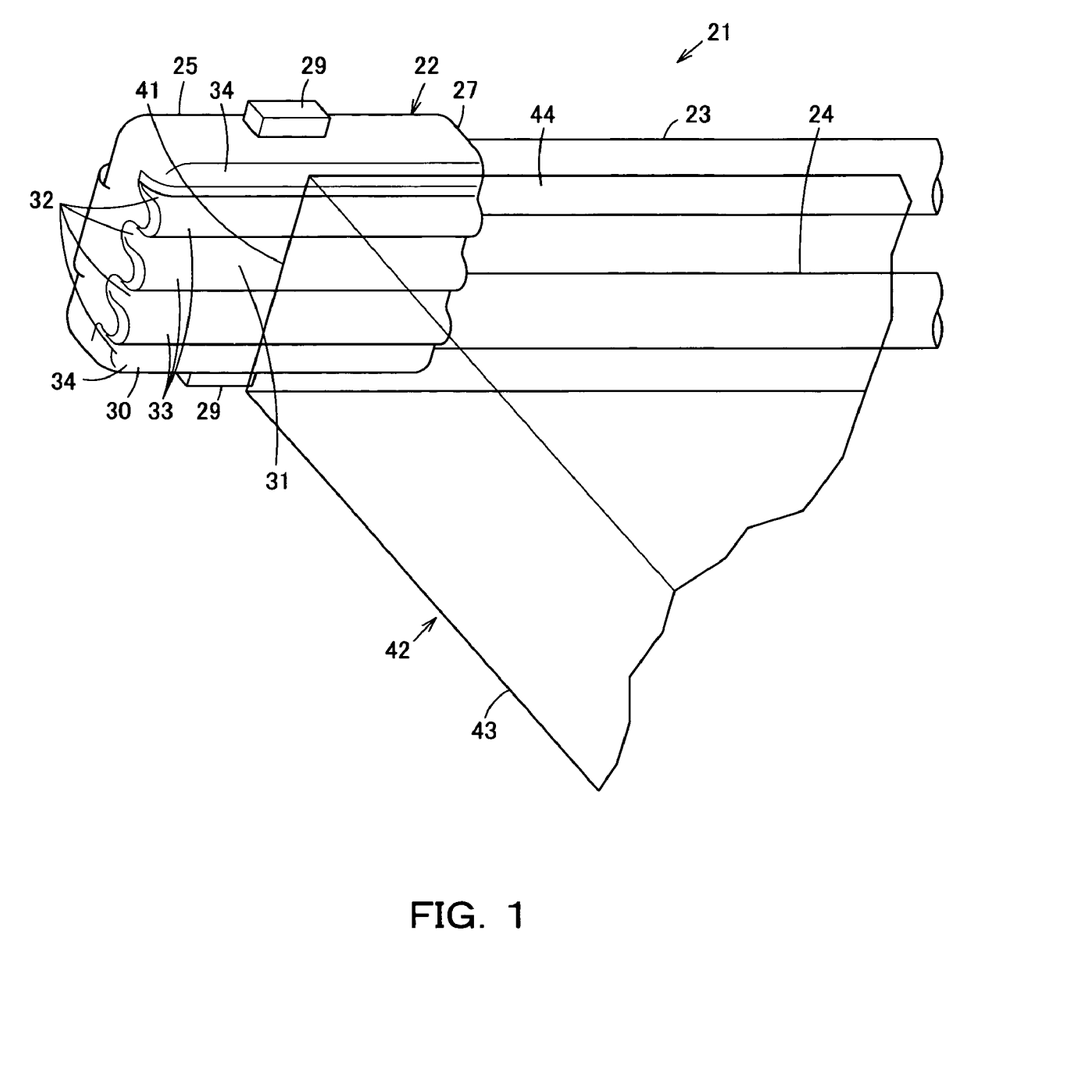
FIG. 1 is a perspective view showing a part of a first embodiment of a surface light source device according to the present invention.
Figure 2:
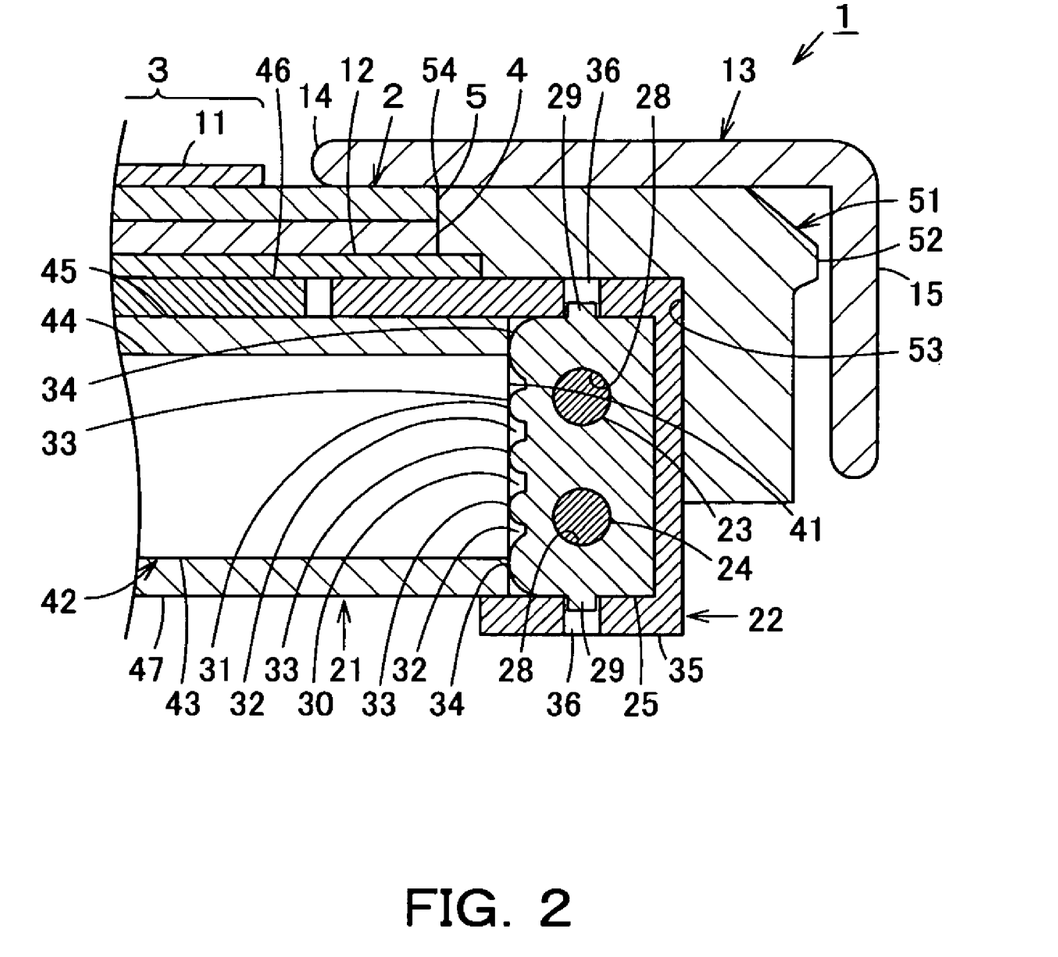
FIG. 2 is a cross-sectional view showing a part of a liquid crystal display device having the surface light source device as above.
Figure 3:
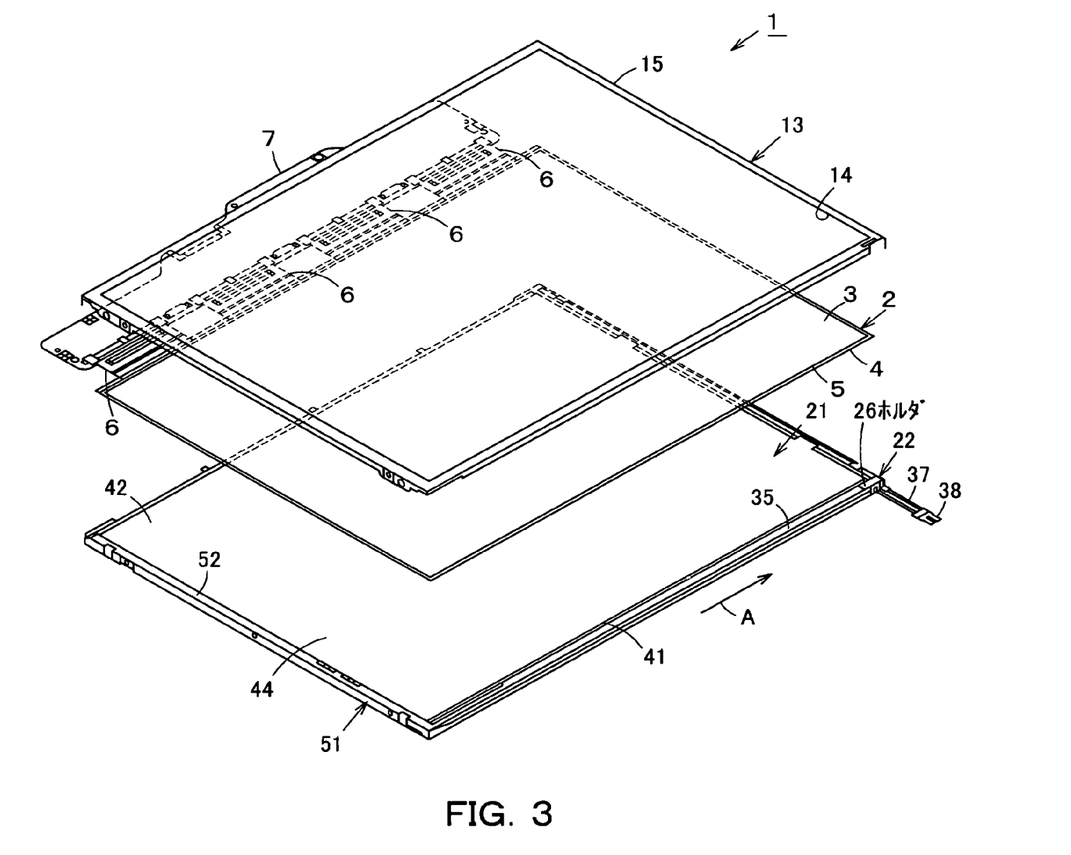
FIG. 3 is an exploded perspective view showing the liquid crystal display device as above.

In FIG. 1 to FIG. 3, reference numeral 1 represents a transmissive type liquid crystal display device as a flat type display device. The liquid crystal display device 1 is a liquid crystal module as a thin input/output integral type liquid crystal display which is relatively large in size with narrower trim and excellent in portability. The liquid crystal display device 1 has a transmissive type substantially rectangular flat plate type liquid crystal panel 2 used as an image display portion, for example, for a laptop type or notebook type personal computer (PC) or the like.

The liquid crystal panel 2 is a liquid crystal display panel as a flat type display panel having a liquid crystal layer as an optical modulation layer, and it is designed as a light transmissive type which can perform color display. A rectangular display frame area 3 as an effective display region for displaying an image is formed at the center portion of the liquid crystal panel 2. A plurality of display pixels (not shown) are arranged in the matrix form on the display frame area 3.

Furthermore, the liquid crystal panel 2 is equipped with an array substrate 4 in which Thin Film Transistors (TFT) (not shown) are provided in matrix form on the surface serving as one principal surface. A counter substrate 5 having a counter electrode formed on the backside surface thereof is provided on the surface of the array substrate 4 so as to face the array substrate 4. The upper end portion as one side portion in the height direction of the counter substrate 5 is located at the further inner side as compared with the upper end portion of the array substrate 4. Furthermore, a liquid crystal layer (not shown) is inserted and sealed between the array substrate 4 and the counter substrate 5, thereby serving as the liquid crystal panel 2.

One end edges of a plurality of (for example, four) slender and rectangular flat plate type printed-wiring boards (Flexible Print Circuit: FPC) 6 are electrically connected to the surface side of the lower end portion of the array substrate 4 as one side edge in the height direction of the liquid crystal panel 2. These printed-wiring boards 6 are driving integrated circuits having flexibility, and fixed so as to be spaced from the center portion at predetermined distances in the lateral direction of the array substrate 4.

Furthermore, a slender and rectangular flat plate type driver circuit 7 serving as a control circuit board as a scan line driving circuit board is attached to the other end edge of the printed-wiring board 6. One side edge in the lateral direction of the driver circuit 7 is attached to the surface side of the upper end portion of the array substrate 4 along the lateral direction via the printed-wiring boards 6. That is, the driver circuit 7 is electrically connected to the array substrate 4 via the printed-wiring boards 6. Furthermore, the driver circuit 7 also serves as a liquid crystal driving circuit board for driving the liquid crystal.

The driver circuit 7 supplies a control signal to the printed-wiring boards 6. Each printed-wiring board 6 supplies a driving signal to each scan line or signal line (not shown) of the liquid crystal panel 2 to drive the liquid crystal panel 2, whereby an image is displayed on the display frame area 3 of the liquid crystal panel 2.

Rectangular flat plate type polarizers 11 and 12 as optical sheets for optically varying light emitted from or incident to the display frame area 3 are attached to the front surface or back surface of the display frame area 3 of the liquid crystal panel 2. These polarizers 11 and 12 polarize surface light emitted from the surface of the display frame area 3 of the liquid crystal panel 2 or light incident to the back surface of the display frame area 3, thereby enhancing the brightness and the uniformity of in-plane brightness of the display frame area 3.

Furthermore, a rectangular frame-shaped bezel cover 13 is attached to the surface side of the liquid crystal panel 2. The bezel cover 13 is equipped with a rectangular frame-shaped main body portion 15 having a rectangular window portion 14 that is formed at the center portion of the main body portion 15 and serves as an opening portion for exposing the surface side of the display frame area 3 of the liquid crystal panel 2. Here, the window portion 14 of the main body portion 15 is formed in a shape corresponding to the display frame area 3 of the liquid crystal panel 2.

Furthermore, a rectangular flat plate type backlight 21 serving as a surface light source device, which is a surface light source device, is attached to the back surface side of the liquid crystal panel 2 so as to face the back surface side of the liquid crystal panel 2. The backlight 21 is an illumination unit used to illuminate the liquid crystal panel 2 from the backside thereof. That is, the backlight 21 emits surface light to the display frame area 3 of the liquid crystal 2 and transmits the light through the display frame area 3 of the liquid crystal panel 2, whereby an image displayed on the display frame area 3 is allowed to be visually recognized. The backlight 21 has a lamp unit 22 as a slender and rod-shaped linear light source for emitting linear light.

The lamp unit 22 has a plurality of (for example, two) cold-cathode fluorescent tubes 23 and 24 as discharge lamps which are elongated and tubular light sources. Substantially rectangular parallelepiped lamp holders 25 and 26 for holding the cold-cathode fluorescent tubes 23 and 24 are engaged and attached to both the end portions of the cold-cathode fluorescent tubes 23 and 24 in the longitudinal direction. These lamp holders 25 and 26 are molded by using rubber, for example. The inner end surface 27 as one end face of each of the lamp holders 25 and 26 in the longitudinal direction is provided with insertion recess portions 28 in which the end portions of the cold-cathode fluorescent tubes 23 and 24 are inserted and fitted. The insertion recess portions 28 are juxtaposed with each other via a predetermined gap interval in the longitudinal direction of the inner end face 27 of each lamp holder 25 and 26.

Furthermore, fitting projection portions 29 are provided to both the side surfaces in the lateral direction of each lamp holder 25 and 26 so as to project outwardly from both the side surfaces concerned. The fitting projection portions 29 are provided at the center portion in both the longitudinal direction and the lateral direction of the lamp holder 25 and 26 so as to project vertically to both the side surfaces concerned. Furthermore, an inner surface 30 as the contact surface corresponding to one side surface in the thickness direction. of the lamp holder 25 and 26 is provided with an uneven surface portion 31 serving as contact area reducing means for reducing the contact area of the inner surface 30. Here, the uneven surface portion 31 is a structure for preventing the close contact of the inner surface 30 in the thickness direction of the lamp holder 25 and 26.

A plurality of (for example, four) groove portions 32 having a U-shaped cross section are linearly provided to the uneven surface portion 31 so as to extend along a draw-out direction A as a detaching direction as the longitudinal direction of the cold-cathode fluorescent tubes 23 and 24 whose one end portions are inserted into the insertion recess portions 28 of the lamp holder 25 and 26. These groove portions 32 are provided along the longitudinal direction of the lamp holder 25 and 26, and arranged in juxtaposition with one another so as to be spaced at regular intervals in the lateral direction of the lamp holder 25 and 26. A projecting portion 33 having a convex-arcuate cross section is provided between the groove portions 32 so as to extend along the draw-out direction A corresponding to the longitudinal direction of the lamp holder 25 and 26. Accordingly, the groove portion 32 and the projecting portion 33 are alternately arranged in parallel in the lateral direction of the lamp holder 25 and 26 on the uneven surface portion 31 of the lamp holder 25 and 26. Furthermore, large-diameter projections 34 having a convex-arcuate cross section larger in lateral dimension than the projecting portions 33 are provided at the outside of the groove portions 32 located at both the side edges in the lateral direction of the lamp holder 25 and 26. The large-diameter projecting portions 34 are also provided along the draw-out direction A corresponding to the longitudinal direction of the lamp holder 25 and 26. Accordingly, the groove portion 32 is provided between the large-diameter projecting portion 34 and the projecting portion 33, thereby constructing the uneven surface portion 31.

Furthermore, the pair of cold-cathode fluorescent tubes 23 and 24 supported by the lamp holders 25 and 26 at both the end portions thereof are engaged and attached in a lamp reflector 35 as a slender and rod-shaped reflector which is bent in a substantially U-shape. Both the end portions in the longitudinal direction of both the facing side surfaces of the lamp reflector 35 are provided with rectangular fitting hole portions 36 in which the fitting projection portions 29 of each of the lamp holders 25 and 26 attached to both the end portions of the pair of the cold-cathode fluorescent tubes 23 and 24 are inserted and fitted when the pair of cold-cathode fluorescent tubes 23 and 24 are held by the lamp reflector 35. These fitting hole portions 36 are arranged so as to be spaced from each other at a predetermined distance along the direction to the inner side from both the end portions in the longitudinal direction of both the side surfaces of the lamp reflector 35.

Furthermore, a base end portion corresponding to one end portion of a cable 37 for turning on the cold-cathode fluorescent tubes 23 and 24 held by the lamp holders 25 and 26 is installed to the outer end surface corresponding to the other end surface in the longitudinal direction of the lamp holder 25. Furthermore, a housing 38 as a connector is attached to the tip end portion corresponding to the other end portion of the cable 37. Accordingly, the cable 37 and the housing 38 respectively light the cold-cathode fluorescent tubes 23 and 24 with power supplied via the housing 38 to the cable 37.

A rectangular and substantially flat plate type light guide plate 42 formed of resin as a prism light guide body is disposed under the state that a light incident face 41 as one end portion at the lamp side is faced parallel to the outer peripheral surfaces of the cold-cathode fluorescent tubes 23 and 24 fitted and held in the lamp reflector 35. Furthermore, the light guide plate 42 is attached so that the light incident face 41 of the light guide plate 42 is faced to the uneven surface portion 31 of each of the lamp holders 25 and 26 attached to both the end portions of the cold-cathode fluorescent tubes 23 and 24 in a state that the light guide plate 42 is brought into contact with the projecting portions 33 and the large-diameter projecting portions 34 of the uneven surface portion 31 of each lamp holder 25 and 26. That is, the light guide plate 42 is held in the bezel cover 13 by the lamp holders 25 and 26. Linear light emitted from the cold-cathode fluorescent tubes 23 and 24 and reflected from the inner surface of the lamp reflector 35 is incident via the light incident face 41 into the light guide plate 42.

Furthermore, the light guide plate 42 refracts linear light incident from the light incident face 41 of the light guide plate 42 in a planar form toward the surface 44 side corresponding to a light emission face as a light exit face facing the back surface 43 as one principal surface of the light guideplate 42. That is, the light guideplate 42 has a translucent property of converting the planar light (refracted the surface 44 side of the light guide plate 42 in a planar form) to flat light and illuminating the flat light toward the back surface side of the display frame area 3 of the liquid crystal panel 2. The lamp reflector 35 reflects the light emitted from the cold-cathode fluorescent tubes 23 and 24 and efficiently guides the reflected light incident to the light incident face 41 of the light guide plate 42.

Furthermore, a plurality of (for example, two) rectangular sheet type optical sheets 45 and 46 are stacked on the surface 44 of the light guide plate 42 so as to cover the surface 44 of the light guide plate 42. These optical sheets 45 and 46 are arranged so as to face the surface 44 of the light guide plate 42, and optically varies the surface light emitted from the surface 44 of the light guide plate 42, thereby enhancing the brightness and the uniformity of the in-plane brightness of the surface 44 of the light guide plate 42.

On the other hand, a reflection sheet 47 as a reflector which is a rectangular sheet type optical sheet covering the back surface 43 of the light guide plate 42 is attached to the back surface 43 of the light guide plate 42. The reflection sheet 47 reflects toward the surface 44 side of the light guide plate 42 the light illuminated from the inside of the light guide plate 42 via the back surface 43 of the light guide plate 42 to the outside.

Furthermore, each optical sheet 45 and 46 is attached to the surface 44 of the light guide plate 42, and the reflection sheet 47 is attached to the back surface of the light guide plate 42. In addition, the backlight 21 constructed by attaching the lamp unit 22 facing the light incident face 41 side of the light guide plate 42 is accommodated and held at the surface side corresponding to one principal surface of a substantially rectangular and flat plate type frame 51 as a housing.

The frame 51 has a substantially rectangular frame-shaped main body portion 52. A concaved holding recess portion 53 in which the backlight 21 is fitted and held is provided at the center portion of the surface side of the main body portion 52. A rectangular opening portion 54 that penetrates through the main body portion 52 in the thickness direction and exposes the display frame area 3 of the liquid crystal panel 2 is formed at the center portion of the holding recess portion 53.

Here, the lamp unit 22 of the backlight 21 is moved and drawn out along the draw-out direction A corresponding to the longitudinal direction of the frame 51 while the side of the lamp unit 22 from which the cable 37 is led out is set to the forefront, whereby the lamp unit 22 can be removed and drawn out from the frame 51. That is, the lamp unit 22 is drawn out from one end of the frame 51 while the side of the lamp unit 22 to which the cable 37 is attached is set to the forefront, whereby the lamp unit 22 can be replaced with another lamp unit 22. Furthermore, the groove portions 32, the projecting portions 33 and the large-diameter projecting portions 34 of each lamp holder 25 and 26 held in the lamp unit 22 are provided along the replacement direction corresponding to the detaching direction and the attaching direction of the lamp unit 22.

The frame 51 is accommodated and held inside the bezel cover 13 while the backlight 21 is held in the holding recess portion 53 of the frame 51 and the liquid crystal panel 2 is held by the frame 51. Furthermore, the printed-wiring boards 6 are bent toward the back surface side of the liquid crystal panel 2 in a state that the display frame area 3 of the liquid crystal panel 2 is exposed from the window portion 14 of the bezel cover 13 and each of the liquid crystal panel 2, the backlight 21 and the frame 51 is accommodated and held in the bezel cover 13, whereby the driver circuit 7 is faced to and superposed on the back surface side of the liquid crystal panel 2 to be accommodated in the frame 51.

Next, the operation of the first embodiment will be described.

First, current is supplied to each cold-cathode fluorescent tube 23 and 24 of the lamp unit 22 of the backlight 21 via the housing 38 and the cable 37 to make the cold-cathode fluorescent tubes 23 and 24 emit light.

At this time, the linear light emitted from the cold-cathode fluorescent tubes 23 and 24 is incident to the light incident face 41 of the light guide plate 42 directly or after it is reflected from the inner surface of the lamp reflector 35 covering the cold-cathode fluorescent tubes 23 and 24.

The light incident to the light incident face 41 of the light guide plate 42 is converted to surface light directed toward the surface 44 side of the light guide plate 42 by the prism (not shown) formed on the back surface 43 of the light guide plate 42 or the reflection sheet 47 attached to the back surface 43 of the light guide plate 42, and then emitted from the surface 44 of the light guide plate 42.

Thereafter, the surface light emitted from the surface 44 of the light guide plate 42 is transmitted through each of the optical sheets 45 and 46 and optically varied by the optical sheets 45 and 46, thereby enhancing the brightness and the uniformity of the in-plane brightness.

The surface light transmitted through these optical sheets 45 and 46 is incident to the polarizer 11 and polarized by the polarizer 11, and then illuminated to the display frame area 3 of the liquid crystal panel 2.

Then, the light illuminated to the display frame area 3 of the liquid crystal panel 2 is selectively transmitted through the display frame area 3, and then incident to the polarizer 12. The incident light is polarized by the polarizer 12, and then enters the eyes of a user, whereby a predetermined image displayed on the display frame area 3 of the liquid crystal panel 2 is visually recognized by the user.

Here, when the brightness of the cold-cathode fluorescent tubes 23 and 24 in the lamp unit 22 of the backlight 21 is lowered due to long-term use of the liquid crystal display device 1 or when the cold-cathode fluorescent tubes 23 and 24 have never been lit, the lamp unit 22 is drawn out from the liquid crystal display device 1 along the draw-out direction A along the lateral direction of the liquid crystal display device 1 while one side of the lamp unit 22 from which the cable 37 is led out is set to the forefront, whereby the lamp unit 22 can be removed. Accordingly, by replacing the lamp unit 22, the reduction of the brightness of the backlight 21 of the liquid crystal display device 1 can be avoided, and the failure of the light operation of the backlight 21 can also be overcome.

However, in the case of a liquid crystal display device 1 as a comparative example in which a flat inner surface 30 serving as one side surface in the thickness direction of each lamp holder 25 and 26 of the lamp unit 22 is faced to and attached to the light incident face 41 of the light guide plate 42 of the backlight 21, when the backlight 21 of the liquid crystal display device 1 concerned is lit for a long period of time, there is a risk that the light guide plate 42 is deformed by the heat which is caused by the lighting of each cold-cathode fluorescent tube 23 and 24 of the backlight 21, and also the adhesiveness of the inner surface 30 of the lamp holder 25 and 26 is enhanced by the heat which is caused by the lighting of each cold-cathode fluorescent tube 23 and 24 of the backlight 21. Therefore, there is a risk that the inner surface 30 of the lamp holder 25 and 26 firmly sticks to the light incident face 41 of the light guide plate 42. Accordingly, when the lamp unit 22 is drawn out for replacement of the lamp unit 22 in the above state, there is a risk that at least a part of the inner surface 30 of each lamp holder 25 and 26 adhering to the light incident face 41 of the light guide plate 42 of the backlight 21 is damaged, and thus a part of the inner surface 30 of the lamp holder 25 and 26 remains in a state that it adheres to the light incident face 41 of the light guide plate 42 of the backlight 21.

Therefore, as in the case of the first embodiment described above, the uneven surface portion 31 is formed on the inner surface 30 in the thickness direction of each lamp holder 25 and 26 of the lamp unit 22 to thereby reduce the contact area between the inner surface 30 and the light incident face 41 of the light guide plate 42. As a result, a gap is formed to some extent between the inner surface 30 and the light incident face 41 of the light guide plate 42, and an air layer is interposed therebetween by means of the gap.

Accordingly, the heat generated from each cold-cathode fluorescent tube 23 and 24 when the backlight 21 of the liquid crystal display device 1 is lit is intercepted between the inner surface 30 of the lamp holder 25 and 26 and the light incident face 41 of the light guide plate 42 by the uneven surface portion 31 provided to the inner surface 30 of each lamp holder 25 and 26. Accordingly, even when the backlight 21 is lit for a long period of time, the close contact between the light incident face 41 of the light guide plate 42 and the inner surface 30 of each lamp holder 25 and 26 can be prevented by the air layer interposed between the inner surface 30 of the lamp holder 25 and 26 and the light incident face 41 of the light guide plate 42.

Furthermore, by forming the uneven surface portion 31 on the inner surface 30 of each lamp holder 25 and 26, the contact area between the inner surface 30 of each lamp holder 25 and 26 and the light incident face 41 of the light guide plate 42 can be reduced. Accordingly, when these lamp holders 25 and 26 are replaced, a part of each lamp holder 25 and 26 can be prevented from adhering and getting stuck to the light incident face 41 of the light guide plate 42 of the backlight 21 and thus remaining there.

Accordingly, it can be prevented that a part of the inner surface 30 of each lamp holder 25 and 26 of the lamp unit 22 sticks to the light incident face 41 of the light guide plate 42 and remains there, and thus the lamp holders 25 and 26 can be easily removed from the light guide plate 42 as the lamp unit 22 together with the cold-cathode fluorescent tubes 23 and 24 and the lamp reflector 35. Therefore, the lamp unit 22 can be easily replaced.

Furthermore, the groove portions 32 each having the U-shaped cross section and the projecting portions 33 and the large-diameter projecting portions 34 each of which has the convex-arcuate cross section are provided on the uneven surface portion 31 of each lamp holder 25 and 26 of the lamp unit 22 so as to extend along the draw-out direction A of the lamp unit 22, thereby reducing the friction force between the uneven surface portion 31 of each lamp holder 25 and 26 of the lamp unit 22 and the light incident face 41 of the light guide plate 42 when the lamp unit 22 is drawn out and removed from the liquid crystal display device 1, and also reducing the contact area between the uneven surface portion 31 and the light incident face 41 of the light guide plate 42. Therefore, the lamp unit 22 can be more easily replaced.

At the same time, the groove portions 32, the projecting portions 33 and the large-diameter projecting portions 34 are respectively provided along the longitudinal direction of the lamp holders 25 and 26, and the convexed fitting projecting portions 29 are provided on both the side surfaces in the lateral direction of each of the lamp holders 25 and 26, whereby the lamp holders 25 and 26 can be molded by using a pair of molds segmentalized along the lateral direction of the lamp holders 25 and 26. Accordingly, the molds can be easily extracted from the lamp holder 25 and 26, and thus the manufacturing performance of the lamp holders 25 and 26 can be enhanced.

In the first embodiment, the uneven surface portion 31 having the groove portions 32, the projecting portions 33 and the large-diameter projecting portions 34 is formed on the inner surface 30 of each lamp holder 25 and 26 of the lamp unit 22. However, as in the case of a second embodiment shown in FIG. 4, and the inner surface 30 of each lamp holder 25 and 26 may be provided with an uneven surface portion 31 having an irregularly uneven shape, whereby the contact area between the inner surface 30 of each lamp holder 25 and 26 and the light incident face 41 of the light guide plate 42 can be reduced.

Figure 4:
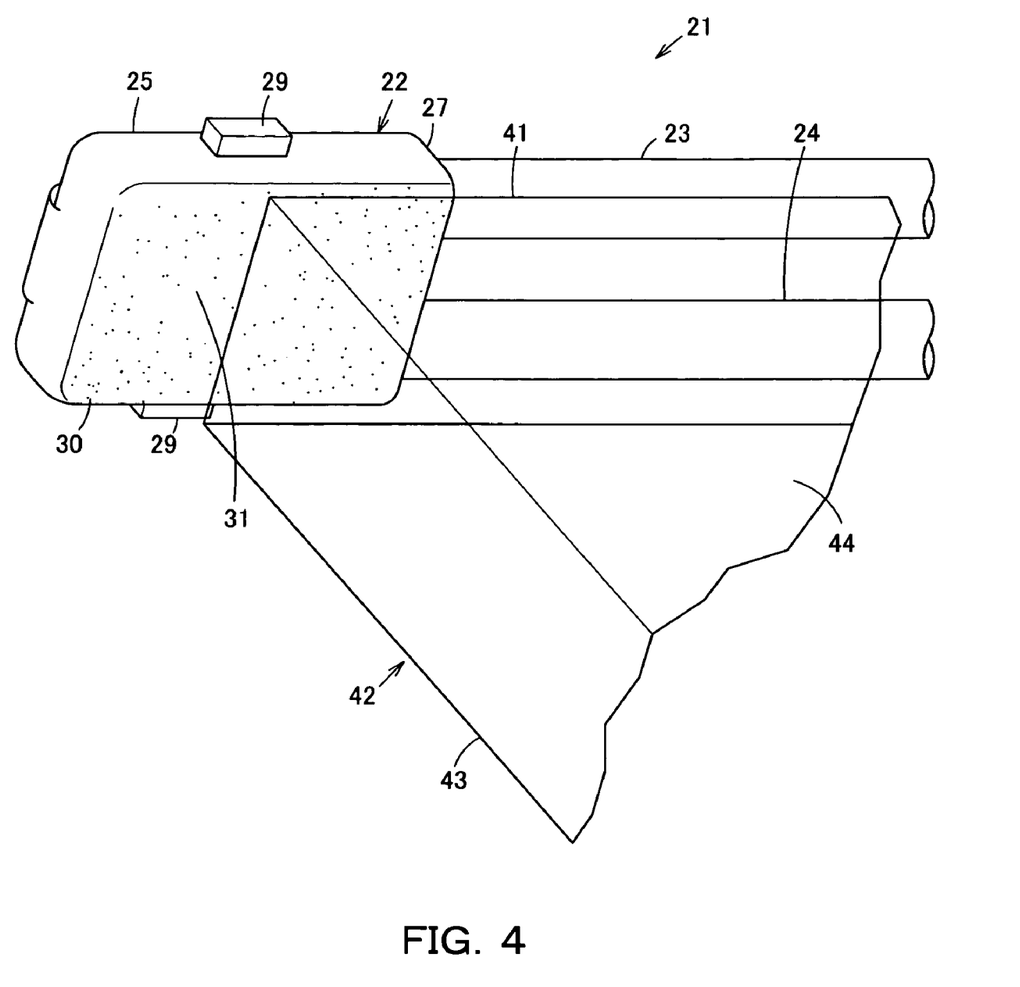
FIG. 4 is a perspective view showing a part of a surface light source device of a second embodiment according to the present invention.

In this case, the uneven surface portion 31 of each lamp holder 25 and 26 has a randomly and minutely uneven surface, that is, the uneven surface portion 31 is designed in a so-called pear-skin finished surface. In other words, these uneven surface portions 31 are formed in a pear-skin finished surface which is formed when no surface treatment is conducted like casting. As a result, heat occurring in each cold-cathode fluorescent tube 23 and 24 when the backlight 21 of the liquid crystal display device 1 is lit is intercepted between the inner surface 30 of each lamp holder 25 and 26 and the light incident face 41 of the light guide plate 42 by the uneven surface portion 31 provided to the inner surface 30 of each lamp holder 25 and 26, so that the same operation and effect as the first embodiment can be achieved.

Furthermore, in the above-described embodiments, the uneven surface portion 31 is provided to the inner surface 30 of each lamp holder 25 and 26 of the lamp unit 21. However, any shape maybe adopted as the surface shape of the inner surface 30 of each lamp holder 25 and 26 as long as it can reduce the contact area between the inner surface 30 of each lamp holder 25 and 26 and the light incident face 41 of the light guide plate 42. Furthermore, the foregoing description has been made for the backlight 21 used in the liquid crystal display device 1 using the liquid crystal layer as the optical modulation layer. However, the present invention may be applied to any flat type display device other than the liquid crystal display device 1 in a corresponding style.

What is claimed is:

1. A surface light source device comprising:
   a tubular light source;
   a holder that is attached to at least one end portion of the light source and has at least one side surface; and
   a flat plate type light guide body that has one end portion brought into contact with one side surface of the holder and guides light incident from the one end portion to one principal surface in a planar form, the light source and the holder being detachably attached in a state that the one end portion of the light guide body faces the light source, wherein
   the holder has a shape of the one side surface of the holder designed as an uneven surface so that the contact area between the one side surface of the holder and the one end portion of the light guide body is reduced,
   the light source and the holder are detachable from the light guide body, and
   the uneven surface is provided with a plurality of projecting portions arranged in a direction crossing the detaching direction of the light source and the holder with respect to the light guide body, and large-diameter projecting portions provided at both the sides of the uneven surface so as to sandwich the plurality of projecting portions therebetween, the lateral dimension of the large-diameter projecting portions being larger than that of the projecting portions.

2. The surface light source device according to claim 1, wherein the uneven surface is provided with a plurality of groove portions each having a U-shaped cross section, and the groove portions are arranged in a direction crossing the detaching direction of the light source and the holder with respect to the light guide body.

3. The surface light source device according to claim 1, wherein the uneven surface is provided with projecting portions each of which is located between the neighboring groove portions, and the groove portions and the projecting portions are alternately arranged in a direction crossing the detaching direction of the light source and the holder with respect to the light guide body.

4. A flat type display device comprising:
   the surface light source device according to claim 1; and
   a flat display panel attached so as to face one principal surface of the light guide body of the surface light source device.

5. A surface light source device comprising:
   a tubular light source;
   a holder that is attached to at least one end portion of the light source and has at least one side surface; and
   a flat plate type light guide body that has one end portion brought into contact with one side surface of the holder and guides light incident from the one end portion to one principal surface in a planar form, the light source and the holder being detachably attached in a state that the one end portion of the light guide body faces the light source, wherein
   the holder has a shape of the one side surface of the holder designed as an uneven surface so that the contact area between the one side surface of the holder and the one end portion of the light guide body is reduced,
   the uneven surface has groove portions each having a U-shaped cross-section,
   the light source and the holder are moved along the longitudinal direction of the light source so as to be detachable from the light guide body, and the groove portions are provided continuously across both end portions of the holder along the longitudinal direction of the light source.

6. The surface light source device according to claim 5, wherein the uneven surface is provided with a plurality of groove portions each having a U-shaped cross section, and the groove portions are arranged in a direction crossing the detaching direction of the light source and the holder with respect to the light guide body.

7. The surface light source device according to claim 5, wherein the uneven surface is provided with projecting portions each of which is located between the neighboring groove portions, and the groove portions and the projecting portions are alternately arranged in a direction crossing the detaching direction of the light source and the holder with respect to the light guide body.

8. A flat type display device comprising:
   the surface light source device according to claim 5; and
   a flat display panel attached so as to face one principal surface of the light guide body of the surface light source device.

* * * * *